United States Patent
McCuin et al.

(10) Patent No.: US 8,464,503 B2
(45) Date of Patent: Jun. 18, 2013

(54) COMPRESSED AIR ENGINE

(75) Inventors: Frank W. McCuin, San Jose, CA (US); Shapour Bakhtiari, Fremont, CA (US); Clinton Johnson, Milpitas, CA (US); Charles C. McCuin, Union City, CA (US); Eric Morton, San Jose, CA (US); Lily Lu, Fremont, CA (US)

(73) Assignee: ShalyMac Energy Systems, San Jose, CA (US)

( * ) Notice: Subject to any disclaimer, the term of this patent is extended or adjusted under 35 U.S.C. 154(b) by 278 days.

(21) Appl. No.: 12/891,584

(22) Filed: Sep. 27, 2010

(65) Prior Publication Data

US 2012/0073280 A1    Mar. 29, 2012

(51) Int. Cl.
*A01D 69/00*    (2006.01)

(52) U.S. Cl.
USPC ......................................................... 56/11.9

(58) Field of Classification Search
USPC ........ 60/370, 407, 410, 412–419; 56/10.2 A–10.2 E, 10.2 R, 10.3, 10.4, 10.5, 10.8, 11.2, 56/11.9; 180/165, 167, 302; 123/59.1, 59.3, 123/190.1, 22
See application file for complete search history.

(56) References Cited

U.S. PATENT DOCUMENTS

| | | | | |
|---|---|---|---|---|
| 3,885,387 A * | 5/1975 | Simington | ...................... | 60/370 |
| 4,124,978 A * | 11/1978 | Wagner | ........................... | 60/410 |
| 4,292,804 A * | 10/1981 | Rogers, Sr. | ..................... | 60/407 |
| 4,942,723 A * | 7/1990 | Wassell | ....................... | 56/10.6 |
| 4,957,622 A * | 9/1990 | Mims | ....................... | 210/170.04 |
| 6,003,312 A * | 12/1999 | Schlichtig | ....................... | 60/370 |
| 6,311,486 B1 * | 11/2001 | Negre et al. | ..................... | 60/370 |
| 6,948,299 B2 * | 9/2005 | Osborne | ....................... | 56/10.8 |
| 7,543,434 B2 * | 6/2009 | Jackson et al. | .................. | 56/298 |

* cited by examiner

*Primary Examiner* — Robert Pezzuto
(74) *Attorney, Agent, or Firm* — James Cai; Schein & Cai LLP

(57) ABSTRACT

An engine comprises a tank of compressed air and a piston. The tank of compressed air is connected to a conduit and the conduit is connected to a cylinder comprising a first valve and an inlet to a chamber. The chamber comprises the piston, which reciprocates. The chamber also has a second outlet connected to a second valve. The air traverses from the tank of compressed into the chamber by opening the first valve. Both the first valve and second valve are closed and the compressed air moves the piston in the chamber to produce work. The second valve opens and the air escapes from the chamber and the piston.

16 Claims, 6 Drawing Sheets

COMPRESSED AIR ENGINE

FIELD OF THE INVENTION

The present disclosure is directed to an energy conversion of fossil fuel combustion engines. More particularly, the present disclosure is directed to the conversion of internal fossil fuel combustion engines with a regulated compressed air power source for energy, such as but not limited to lawnmowers, vehicles, portable machinery, and mobile equipment

BACKGROUND OF THE RELATED ART

Combustion engines, commonly used for mobile propulsion in vehicles, portable machinery, and so on, are generally powered by gasoline, diesel, or other, fossil fuel that produce significant emission due to the combustion of the fuel. Carbon dioxide, carbon monoxide and nitrous oxide are generated from the combustion of fuels. The emissions have a negative effect on the environment. With escalating fuel costs and increasing concerns over the effects of emissions green technology or clean technology has become a favorable alternative within the last few decades. Currently, the most popular green technology alternatives for combustion engines available in the market are solar, electric, and heated compressed air.

Although these alternatives represent a marked improvement over gasoline and fossil fuels with respect to emissions and pollutants, they are not without drawbacks. The solar powered engine has one or more solar panels, which require recharging of the panels' battery cells. Typically, this recharge can be two to three sunny days or four to five cloudy days. It's understandable that both these methods are undesirable due to the fact that they limit the availability of the engine during recharging. Similarly, the alternative electric powered engine has batteries, or an electrical extension cord, which generally must be recharged or powered with standard AC current.

As a result, this recharge can be from hours to days in duration. This is not pragmatic for engine demands from people that commute or desire to take long trips of four hours or more. Another consideration is inconvenience of the electrical extension cord range limitations. Ordinarily, where significant engine speeds are involved, heated compressed air has been used to increase the air's volume in order to achieve these desired speeds. The heated compressed air engine requires a heat source usually powered by another energy means. These energy means may or may not be environmentally friendly. A means of economically providing an energy conversion module powered by regulated compressed air for fossil fuel combustion engines without producing harmful emissions or polluting the air, would be valuable to green technology as well as greenhouse gasses affecting the earth's atmosphere.

SUMMARY OF THE INVENTION

According to a first aspect of the present disclosure, there is provided an engine comprising a source of compressed air being connected to a conduit. The conduit is connected to a first valve and an inlet to a chamber. The chamber comprises a piston and a second outlet being connected to a second valve. The air traverses from the source of compressed air into the chamber by opening the first valve. Both the first valve and second valve are closed and the compressed air moves the piston in the chamber to produce work. The second valve opens and the air escapes from the chamber.

According to yet another aspect of the present disclosure there is provided a method comprising providing a source of compressed air and operating an engine with the compressed air by communicating the compressed air to the engine to reciprocate a piston from bottom dead center to top dead center or vice versa in a reciprocal manner.

According to a further aspect of the present disclosure there is provided an engine comprising a tank of compressed air. The tank of compressed air is connected to a conduit and the conduit is connected to a cylinder comprising a first valve and an inlet to a chamber. The chamber comprises a piston. The chamber also has a second outlet connected to a second valve. The air traverses from the tank of compressed into the chamber by opening the first valve. Both the first valve and second valve are closed and the compressed air moves the piston in the chamber to produce work. The second valve opens and the air escapes from the chamber and the piston.

According to yet another aspect of the present disclosure there is provided a lawn mower comprising a blade being coupled to a drive shaft and an engine connected to the drive shaft for rotating the drive shaft. The lawn mower also has a tank of compressed air. The tank of compressed air is connected to a conduit. The conduit is connected to a cylinder of the engine and the engine comprises a first valve and an inlet to a chamber. The chamber comprises a piston and a second outlet being connected to a second valve. The air traverses from the tank of compressed into the chamber by opening the first valve. Both the first valve and second valve are closed and the compressed air moves the piston in the chamber to produce work to rotate the drive shaft and to rotate the blade. The second valve opens and the air escapes from the chamber and the piston. The engine provides that no combustion occurs in the cylinder and the piston reciprocates from the compressed air moving the piston.

According to yet another aspect of the present disclosure there is provided a vehicle comprising a drive shaft and an engine connected to the drive shaft for rotating the drive shaft. The vehicle also has a tank of compressed air. The tank of compressed air is connected to a conduit. The conduit is connected to a cylinder of the engine and the engine comprises a first valve and an inlet to a chamber. The chamber comprises a piston and a second outlet being connected to a second valve.

The air traverses from the tank of compressed into the chamber by opening the first valve. Both the first valve and second valve are closed and the compressed air moves the piston in the chamber to produce work to rotate the drive shaft. The second valve opens and the air escapes from the chamber and the piston. The engine provides that no combustion occurs in the cylinder and the piston reciprocates from the compressed air moving the piston.

BRIEF DESCRIPTION OF THE FIGURES

The foregoing and other objects, features and advantages of the invention will be apparent from the following more particular description of preferred embodiments of the invention, as illustrated in the accompanying drawings in which like reference characters refer to the same parts throughout different views. The drawings are not meant to limit the invention to particular mechanisms for carrying out the invention in practice, but rather, are illustrative of certain ways of performing the invention. Others will be readily apparent to those skilled in the art.

DETAILED DESCRIPTION OF THE PREFERRED EMBODIMENTS

The energy conversion module powered by regulated compressed air of the present invention overcomes the problems associated with prior art. It does not require several hours or days of recharging the power source. Nor is there a need for standard AC current recharge, or a required electric cord for the compressed air used. The energy conversion module of the present invention is specially designed to run on one or more tanks of regulated compressed air.

There are essentially no emissions or air pollution generated by the conversion module since there is no combustion of fuel and no spark plugs or combustion of diesel or gasoline. The secondary benefit to the energy conversion module powered by regulated compressed air is that it also eliminates many of the standard components currently used for fossil fuel combustion engines. The energy conversion module is comprised of a regulated compressed air energy source 30 attached to pneumatic solenoids 70.

Figure 3:
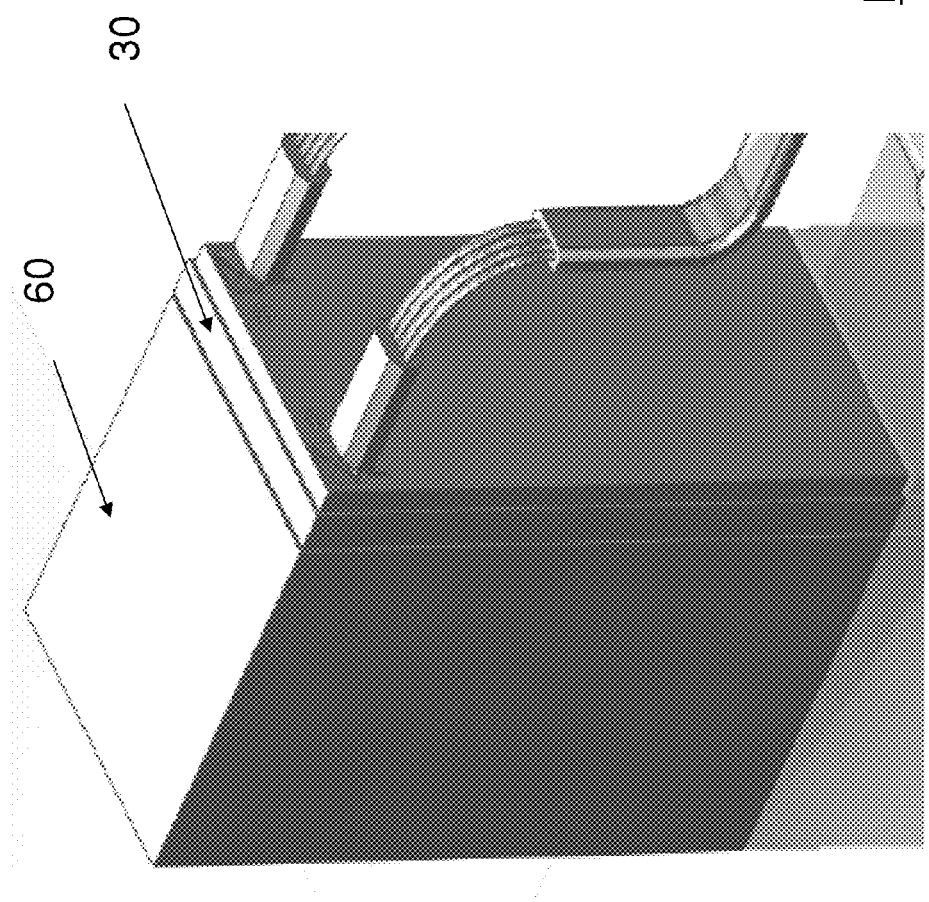
FIG. 3 is a perspective view showing the controller/battery case of FIG. 1 containing the power supply and controller.

A rechargeable 12V battery 60, located inside the controller/battery case (as shown in FIG. 3) is used to energize the solenoids 70, which are attached to an air actuator 50 connected to the engine drive shaft apparatus. Battery 60 is not limited to the 12 volt configuration and may be differently configured. The motion generated by the actuator 50 is used to power the drive assembly of the combustion engine. Various drive assemblies are possible and within the scope of the present disclosure.

The objectives of the present disclosure are to illustrate the following: 1) an energy conversion module for fossil fuel combustion engines with a means of using regulated compressed air 30 as a power source; 2) a means of using a conversion module to eliminate several components commonly associated with fossil fuel combustion engines, and; 3) a means of eliminating air pollution produced by fossil fuel combustion engines through the function of a conversion module. Furthermore, it is an object of this application to illustrate the preferred embodiments and broadly state the methodology that may be used to convert fossil fuel combustion engines using the conversion module.

Figure 1:
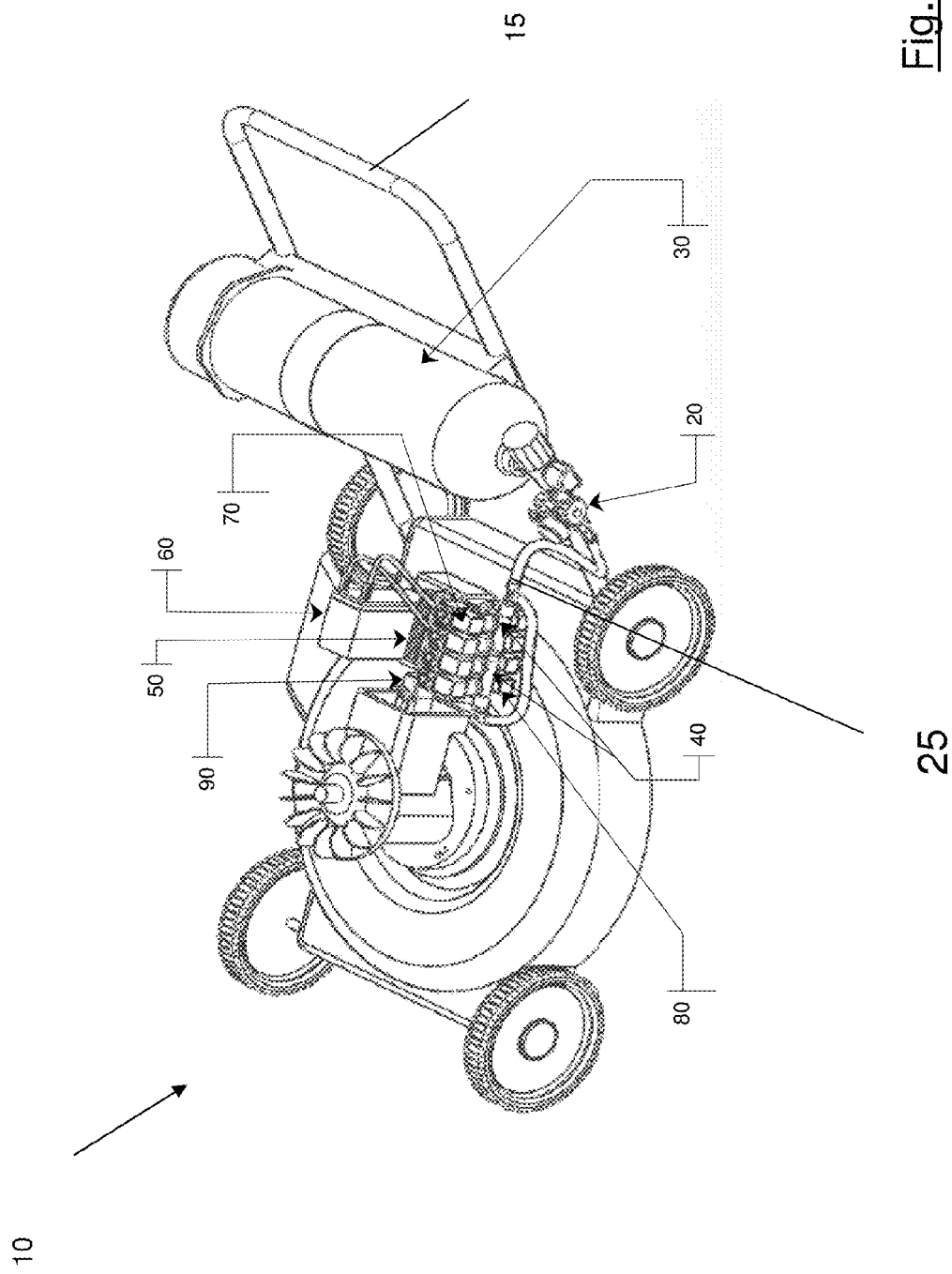
FIG. 1 is a side perspective view of the present invention illustrating the components that make up the preferred embodiments.

Turning now to FIG. 1, there is shown a lawn mower or vehicle 10 according to the present disclosure. The lawn mower 10 is not limited to the embodiment shown and it should be appreciated that the lawn mower 10 can be any vehicle, craft, airplane, helicopter, automobile, motorcycle, scooter, a vehicle with a hybrid engine, a vehicle with a diesel engine, a vehicle with a gasoline engine or any other craft known in the art that can use an electric motor or an internal combustion engine. Various configurations are possible and within the scope of the present disclosure. The lawn mower 10 preferably includes a source of compressed air 30 and a pressure regulator 20 connected to the source of compressed air 30 by a conduit 25 or the like. Preferably, compressed air will flow from the tank 30 into the conduit 25 and then is communicated to the pressure regulator 20. Preferably, the tank 30 may vary in size and may further comprise a pump (not shown) to pressurize fluid on the fly. Air can be any fluid known in the art.

Figure 5:
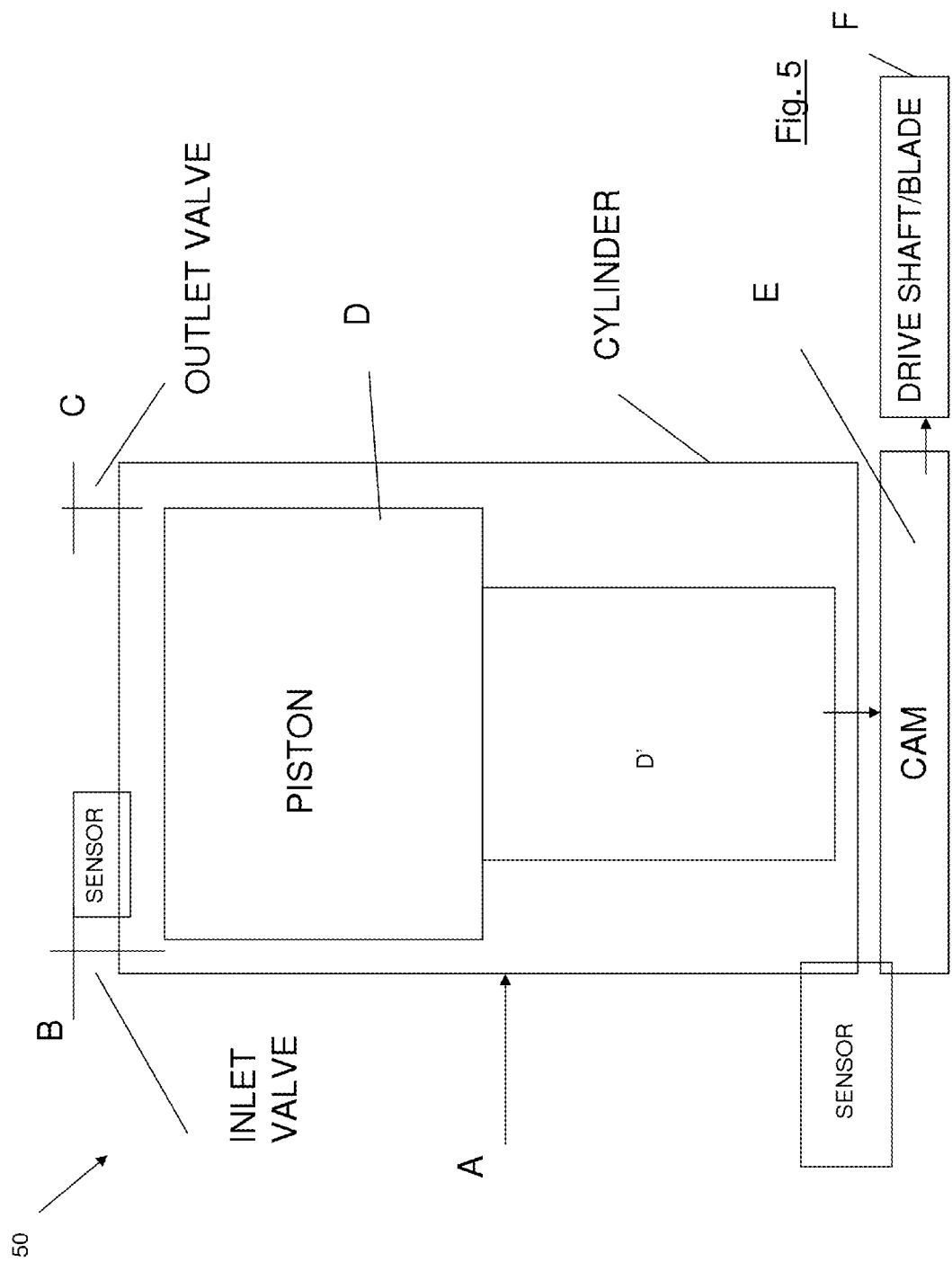
FIG. 5 shows a piston in a top dead center position being connected to a cam and a drive shaft and a blade.
Figure 6:
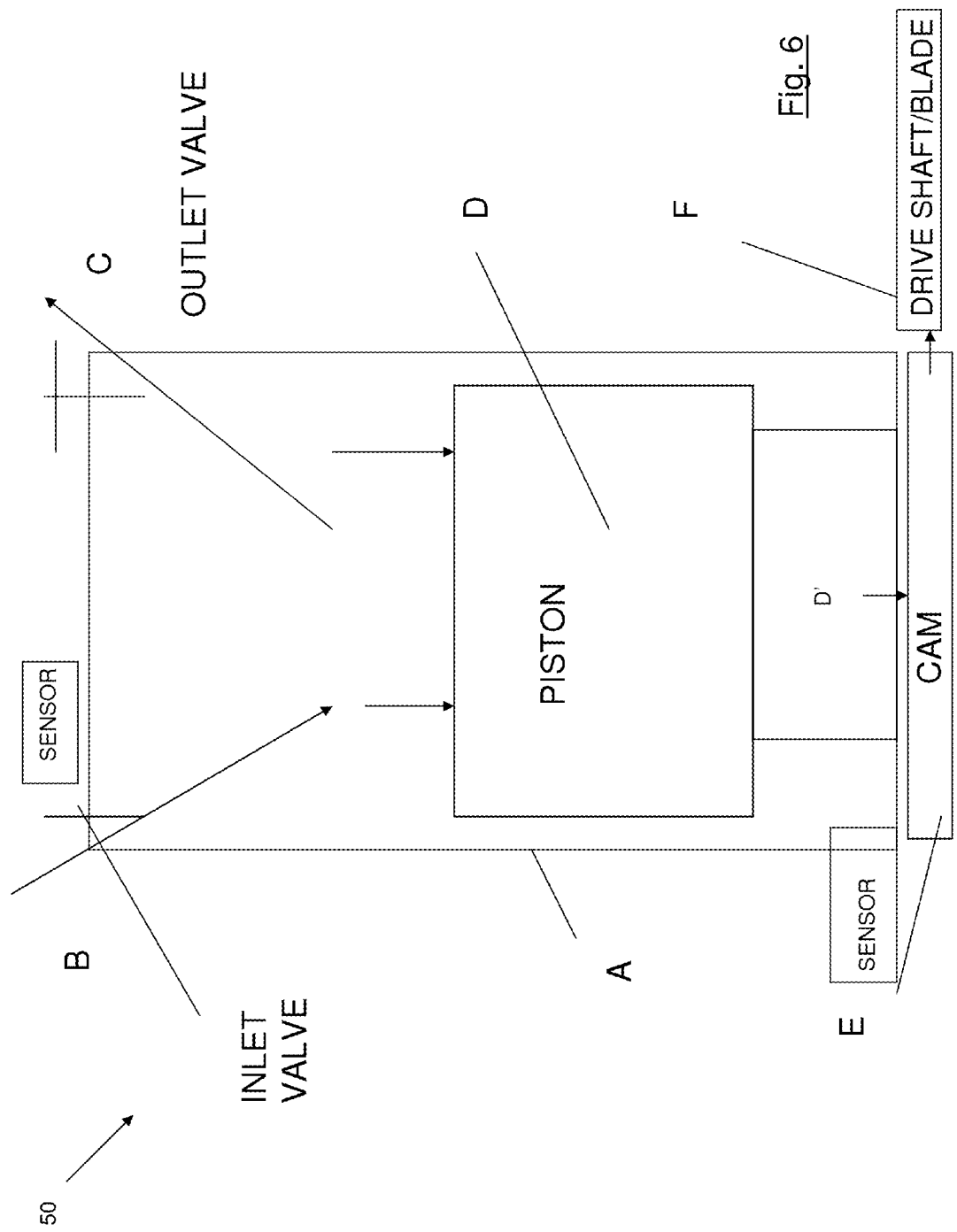
FIG. 6 shows a piston with the inlet valve opened and the compressed air moving the piston from the top dead center position to the bottom dead center position and moving the cam to reciprocate the drive shaft and to reciprocate the blade.

The lawn mower 10 further includes an intake manifold 40 preferably communicating with the conduit 25 and the pressure regulator 20. The intake manifold 40 preferably receives compressed air from the air supply tank 30. The intake manifold 40 is an intake manifold or inlet manifold and is the part of an engine that supplies the air to a cylinder (FIGS. 5-6). An exhaust manifold (not shown) is disposed on the exhaust solenoid assembly 80 and collects the exhaust gases from the one or more cylinder into one pipe to release the compressed air back to the air supply tank 30 to be re-pressurized or (alternatively) to vent the exhaust gases back to ambient.

The lawn mower 10 also includes a pneumatic actuator 50 and an intake solenoid assembly 70 and a controller 60. The pneumatic actuator 50 converts the energy in the compressed air into motion. The pneumatic actuator 50 preferably includes a piston D, a cylinder A, and valves B, C or ports shown in FIGS. 5-6. The piston D is covered by a diaphragm, or seal, which keeps the air in the upper portion of the cylinder A, allowing air pressure to force the diaphragm downward, moving the piston D underneath, which in turn moves the valve stem D', which is linked to the internal parts of the actuator 50. It should be appreciated that the actuator 50 may comprises a multiple cylinder configuration with a number of pistons D with at least one piston D in at least one cylinder A and two valves B, C per cylinder A. Alternatively, the cylinder A may include a rotary configuration. The pneumatic actuator 50 may comprise a two stroke configuration or a four stroke configuration or another configuration. Further, the valves A and B may be at a bottom side and the piston D may be driven in reverse.

Pneumatic actuators 50 may only have one spot for a signal input, top or bottom, depending on action required. Valves B, C require little pressure to operate and usually double or triple the input force. The larger the size of the piston D, the larger the output pressure can be and thus the more force may be impart on a cam E or the like to move the blades F of the lawn mower 10. Having a larger piston D can also be good if air supply is low, allowing the same forces with less input.

In FIG. 1, lawnmower 10 has a pressure regulator 20, with an air supply tank 30, intake manifolds 40, pneumatic actuator 50, power supply and controller 60, intake solenoid assembly 70, exhaust solenoid assembly 80, and universal clevis 90. Clevis 90 is preferably a coupler shaped like the letter U with holes through each end so a bolt or pin can pass through the holes to complete the coupling on the lawnmower 10 or existing similar structure on a gas engine or the like. For illustration purposes of the energy conversion module for fossil fuel combustion engines, a lawnmower engine 10, as in FIG. 1, will be demonstrated.

After a pressure regulator 20 is fitted to the air supply tank 30, the air supply tank 30 is filled with compressed air from a remote pump or air refueling station or from an integral pump (not shown). It should be appreciated that the pump (not shown) may be integrated within the lawn mower 10. The air supply tank 30 is secured to the lawnmower handle 15 by brackets. A hose 25 extending from the pressure regulator 20 is attached to the intake manifolds 40. Solenoids are attached to the intake manifolds 40 to make up the intake solenoid assembly 70 and exhaust solenoid assembly 80. Air enters the manifolds from the air supply tank 30 via the pressure regulator 20, which has been manually set to achieve a reading of greater than 20 psi.

The pneumatic actuator 50 is connected to intake and exhaust supply ports (not shown) of the intake solenoid assembly 70 and exhaust solenoid assembly 80. Located on the pneumatic actuator 50 are position sensors (not shown).

The controller 30 powered by the power supply 60 activates the solenoids of the intake solenoid assembly 70 and exhaust solenoid assembly 80 based on the location of the position sensors (FIGS. 5 and 6) which can be disposed on a top and bottom of the piston D or in the piston D. The controller 60 is a circuit that identifies location of the pneumatic actuator shaft (not shown) and activates each of the solenoids of the intake solenoid assembly 70 and exhaust solenoid assembly 80 accordingly. The universal clevis 90 connects the pneumatic actuator shaft (not shown) and the connecting rod (not shown) to the drive shaft (not shown), which creates rotation of the cutting blade (not shown). Preferably, the cutting blade F is operatively connected to a drive shaft, which is connected to a cam E. The cam E contacts the piston D (FIGS. 5 and 6). When the piston D in the pneumatic actuator 50 is driven in a first direction by the force of the compressed air, then the piston D moves the cam E a predetermined radial amount. Preferably, the cam E then rotates the drive shaft, which rotates the blades F to cut the grass or to move the tires or the like. This is accomplished without combustion as the air seeks to expand upon being introduced into the chamber A.

Figure 2:
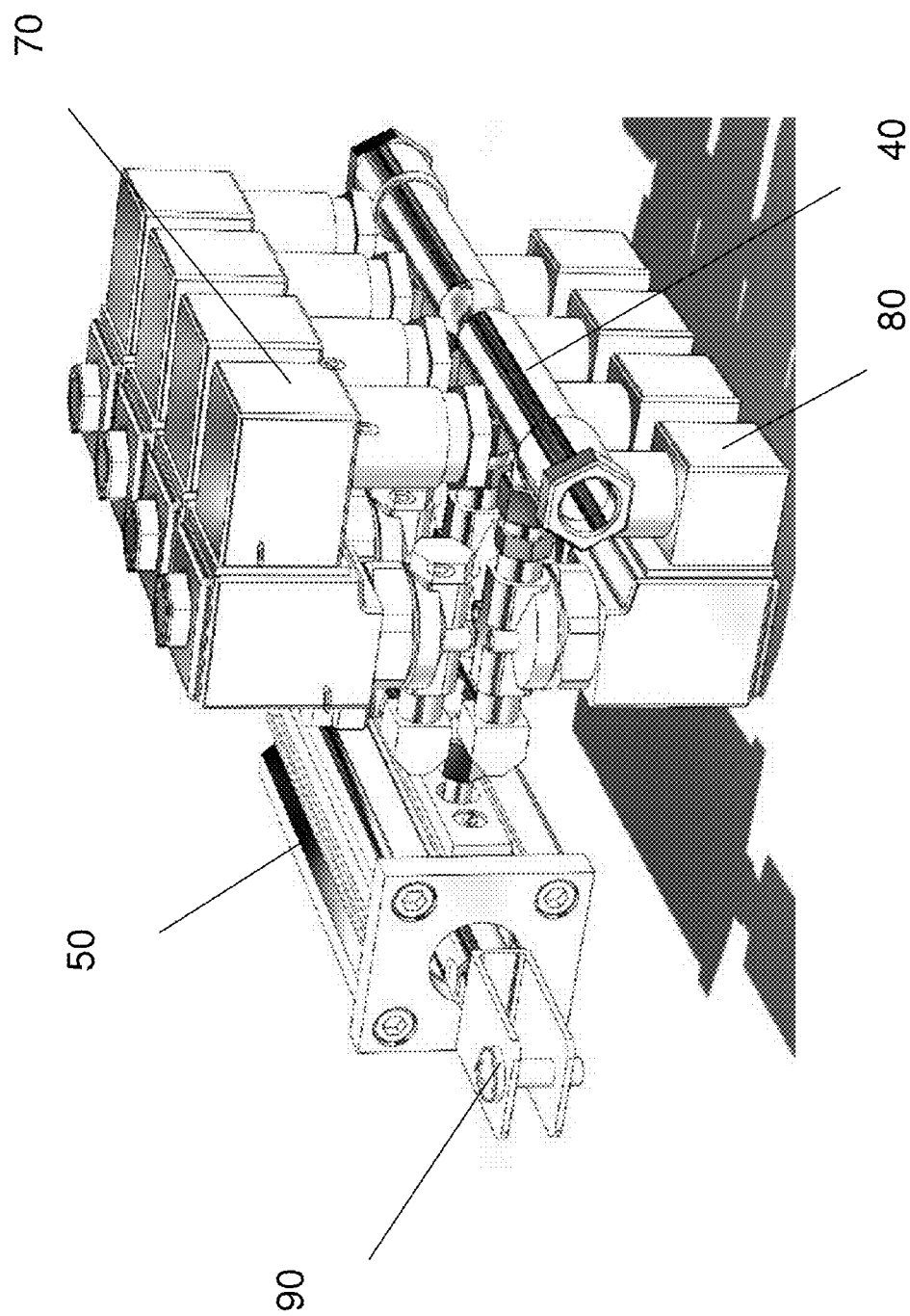
FIG. 2 is a perspective view showing the solenoid/actuator assembly of FIG. 1 and that is assembled for the conversion of a fossil fuel combustion engine.

Turning now to FIG. 2, there is shown the solenoid/actuator assembly 20 and the intake manifolds 40, with the pneumatic actuator 50, the intake solenoid assembly 70, the exhaust solenoid assembly 80, and the universal clevis 90. Preferably, disposed in the pneumatic actuator 50 is a piston D in a cylinder A. The piston D moves from a top dead center position to a bottom dead center position based on the movement of the compressed air that is introduced into the cylinder A by an inlet valve B. The controller 30 preferably is operatively connected to the valve to open and close the valve based on a position of the piston, which is sensed by a position sensor. The controller 30 also preferably is operatively connected to a second exhaust valve C to open and close the exhaust valve C based on the position of the piston D. In an alternative embodiment, the pneumatic actuator 50 may comprise a rotary Wankel configuration.

The piston D is covered by a diaphragm, or seal, which keeps the air in the upper portion of the cylinder A, allowing air pressure to force the diaphragm downward, moving the piston D underneath, which in turn moves the valve stem D', which is linked to the internal parts of the actuator 50. Turning now to FIG. 3, there is shown a controller 30 and a battery generally represented by reference numeral 60. Preferably, the controller 30 is operatively connected to the battery 60 so the controller 30 and the electrical components may draw power from the battery 60. Various battery configurations are possible and are within the scope of the present disclosure. The battery 60 may be a nickel hydride configuration, a lithium ion configuration or any other configuration known in the present disclosure.

Figure 4:
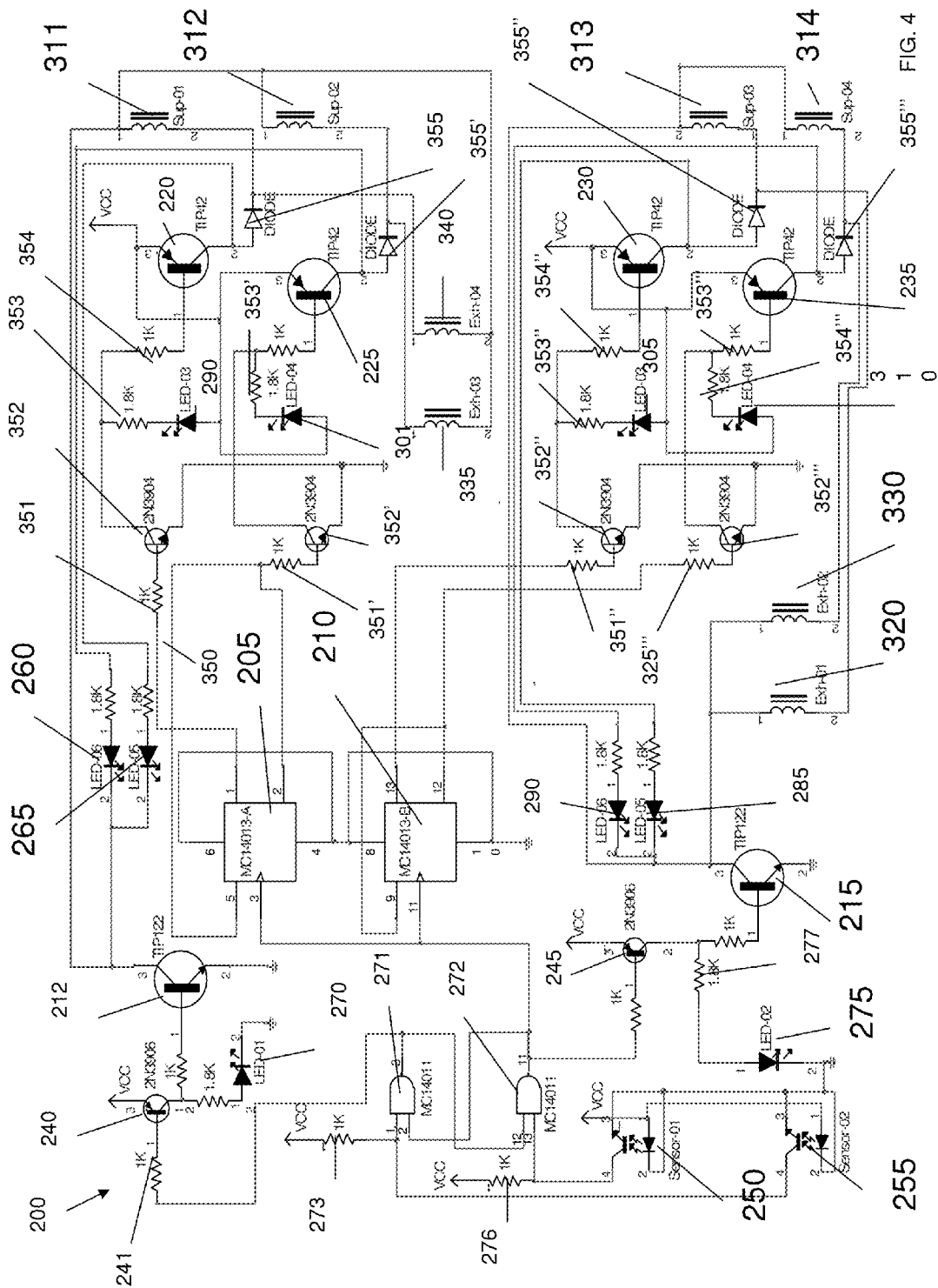
FIG. 4 is a schematic of a controller configuration for the lawn mower.

Turning now to FIG. 4, there is shown an electrical controller schematic illustrating operation of the electrical components of the present disclosure generally shown as reference numeral 200. The circuit 200 preferably includes a first semiconductor integrated circuit, D flip-flop pair MC14013-A shown as 205 and the second device, MC14013-B shown as reference numeral 210.

Device 205 alternates a retract signal between two supply solenoids 311 and 312 and two exhaust solenoids 335 and 340, via pre-amps 352 and 352' and power-amplifiers 220, 225. Device 210 alternates an advance signal between two supply solenoids 313 and 314 and two exhaust solenoids 320 and 330, via pre-amps 352" and 352'" and power-amplifiers 230 and 235. I It should be appreciated that alternating the signal between two supply and two exhaust solenoids 313 and 314 provides a longer recovery period for each solenoid 313 and 314. Solenoids 313 and 314 with shorter recovery time obtain a single advance and a single retract signal via pins 3 and 11 of the integrated circuit MC14013 205 connected to negative and not to output pin 11 on the MC14011 integrated circuit 210 and this applies when only four solenoids are used. Various solenoid configurations are possible and within the scope of the present disclosure and circuit 200 forms no limitations to the present disclosure. Circuit 200 preferably includes position sensors 250 and 255 (shown in the bottom left hand portion of the figure) connected to integrated circuit MC14011, a wired NAND-gate latch, gates 1 and 2 referenced as 271 and 272 respectively.

The NAND-gate latch 272 controls a switching negative bias for the supply and exhaust solenoids on the retract bank as shown by references 311, 312, 335 and 340 via pre-amp transistor 240 and power-amp transistor 212.

The complementary NAND-gate latch signal controls a switching negative bias for the supply and exhaust solenoids on the advance bank as shown by reference numerals 313, 314, 320 and 330 via pre-amp transistor 245 and power-amp transistor 215. The NAND-latch also provides the clock-pulse signals for devices 205 and 210 via output pin 11.

Circuit 200 further includes a number of light emitting diodes 260-310 to provide an indication to the user of one or more operating parameters. Preferably, the sensor 250 and the second sensor 255 detect movement of a piston D and reports the positions to the controller via the primary NAND-gate latch.

Preferably, the control circuit 200 receives the position signals and opens a supply and exhaust valve combination, alternating between the advance and retract banks with contingency on the position of piston D to communicate compressed air into the cylinder A and to move the piston D to move the cam and to drive the shaft as described above.

It should be understood that circuit 200 includes several repeated configurations of the respective D flip-flop devices 205 or 210 being connected by a lead to a resistor 351 as shown in the top right of the schematic. The resistor 351 is connected to an NPN transistor, 352 which is connected to a resistor 353 connected to a light emitting diode 290.

The resistor 353 is 1.8 k resistance and is also connected to a 1 k resistor, which is connected to a PNP power transistor 220. On the first retract signal (when the piston D is advanced to a position) the transistor 220 provides a voltage Vcc to illuminate light emitting diode 265 and is also connected to diode 355. Preferably, the diode 355 is connected to supply solenoid 311 and exhaust solenoid 340, which opens pneumatic valves (not shown) and causes the piston D to retract. This action is repeated on the next retract signal, this time illuminating light emitting diode 260 and activating supply solenoid 312 and exhaust solenoid 335 which also opens pneumatic valves (not shown) and initiates retract of the piston D.

Preferably the lower right quadrant of circuit schematic 200 operates with the same characteristics, activating PNP power transistor 230, illuminating light emitting diode 285, activating supply solenoid 313 and exhaust solenoid 320 on the first advance signal (when the piston D is fully retracted) which opens pneumatic valves (not shown) and initiates advance of the piston D. This action is repeated on the next advance signal, this time illuminating light emitting diode 290 and activating supply solenoid 314 and exhaust solenoid 330 which also opens pneumatic valves (not shown) and initiates advance of the piston D.

D flip-flop device reference 205 (integrated circuit MC14013) selects and turns on one of two supply and exhaust solenoid pairs for retract of the piston D. D flip-flop device 210 (integrated circuit MC14013) selects and turns on one of two supply and exhaust solenoid pairs for advance of the piston. This option will permit use of slower reacting solenoids. For fast acting solenoids (required speed vs recovery time) pins 3 and 11 should be wired to 0V instead of output pin 11 shown as IC MC14011. Sensors are preferably NPN opto-isolator or NPN solid state magnetic.

Turning now to FIGS. 5 and 6 there is shown a piston in a simplified diagram that can be manufactured in the pneumatic actuator 50 or in a different configuration or the like. As shown the cylinder A preferably has a first port B and a second port C with an inlet valve and an exhaust valve. Compressed air is directed into the inlet valve B. The compressed air then contacts the piston D and drives the piston D from a top dead center position to a bottom dead center position as shown in FIG. 6 and this is attributed solely to the air being expanded without combustion. Alternatively, the valve B may be on the bottom side and the piston D can be driven from the bottom dead center to top dead center. Further, the cylinder A may have a rotary configuration. The piston D then moves a cam and a cam E reciprocates a drive shaft F as shown. Thereafter, as the sensors detect that the piston D approaches the bottom dead center position; the controller 30 closes the inlet valve B and opens the exhaust valve C whereas the expanded compressed air is directed out of the cylinder A. Thereafter, the piston D is drawn up to top dead center for the next cycle whereas the exhaust valve C is closed. It should be appreciated that no combustion occurs in the cylinder A so no harmful emissions are created and relatively pure air is exhausted. A pump may be provided to provide compressed air and to recharge the compressed air tank. Air can be circulated in a closed loop to back into the tank 30 or in an open loop where the air is exhausted to ambient.

It should be appreciated that the present electronic components may be implemented in a computer environment as a time display for example in a software application. Generally, in operation, the computer system operable with that method shown in FIG. 4 may be controlled by an operating system. Typical examples of operating systems are MS-DOS and Windows 95, Vista, Windows 7 from Microsoft Corporation, or Solaris and SunOS from Sun Microsystems, Inc., or the Apple OSX from Apple Corporation. As the computer system operates, input such as input search data, database record data, programs and commands, received from users or other processing systems, are stored on storage device. Certain commands cause the processor to retrieve and execute the stored programs. The programs executing on the processor may obtain more data from the same or a different input device, such as a network connection. The programs may also access data in a database for example, and commands and other input data may cause the processor to index, search and perform other operations on the database in relation to other input data. Data may be generated which is sent to the output device for display to the user or for transmission to another computer system or device. Typical examples of the computer system are personal computers and workstations, hand-held computers, dedicated computers designed for a specific purpose, and large main frame computers suited for use by many users. The present invention is not limited to being implemented on any specific type of computer system or data processing device.

It is noted that the present invention may also be implemented in hardware or circuitry which embodies the logic and processing disclosed herein, or alternatively, the present invention may be implemented in software in the form of a computer program stored on a computer readable medium such as a storage device. In the later case, the present invention in the form of computer program logic and executable instructions is read and executed by the processor and instructs the computer system to perform the functionality disclosed as the invention herein. If the present invention is embodied as a computer program, the computer program logic is not limited to being implemented in any specific programming language. For example, commonly used programming languages such as C, C++, JAVA as well as others may be used to implement the logic and functionality of the present invention. Furthermore, the subject matter of the present invention is not limited to currently existing computer processing devices or programming languages, but rather, is meant to be able to be implemented in many different types of environments in both hardware and software.

Furthermore, combinations of embodiments of the invention may be divided into specific functions and implemented on different individual computer processing devices and systems which may be interconnected to communicate and interact with each other. Dividing up the functionality of the invention between several different computers is meant to be covered within the scope of the invention.

While this invention has been particularly shown and described with references to a preferred embodiment thereof, it will be understood by those skilled in the art that is made therein without departing from the spirit and scope of the invention as defined by the following claims.

What is claimed is:

1. An engine comprising:
    a source of compressed air being connected to a conduit, the conduit being connected to a first valve and an inlet to a chamber; the chamber comprising a piston and a second outlet being connected to a second valve;
    the air traversing from the source of compressed air into the chamber by opening the first valve, wherein both the first valve and second valve are closed and the compressed air moves the piston in the chamber to produce work, the second valve opening and the air escaping from the chamber;
    an electric circuit configured for electronically opening and closing said first valve and said second valve, wherein said electric circuit opens and closes said first valve and said second valve based on position of said piston in said chamber, and wherein sensors installed at a top dead center and at bottom dead center of said chamber provide said electric circuit with said position of said piston in said chamber.

2. The engine of claim 1, wherein the engine is used in a lawnmower and emits only air and no emissions.

3. The engine of claim 1, wherein the compressed air moves the piston from a top dead center position to a bottom dead center position.

4. The engine of claim 1, wherein the source of compressed air is directed from a compressed air tank.

5. The engine of claim 1, wherein the piston reciprocates continuously from the top dead center position and the bottom dead center position as the first valve opens and closes to introduced compressed air into the chamber and as the second valve is opened to release the air from the chamber.

6. The engine of claim 1, further comprising a pump for refilling the source of compressed air when the source of compressed air is exhausted.

7. The engine of claim 1, further comprising a regulator disposed between the source and the first valve.

8. The engine of claim 1, wherein the first valve is disposed in an intake manifold.

9. The engine of claim 1, wherein the engine comprises at least two cylinders and wherein the piston is located in a pneumatic actuator.

10. A method comprising:
providing a source of compressed air;
operating an engine with the compressed air by communicating the compressed air to the engine to reciprocate a piston in a chamber from bottom dead center to top dead center in a reciprocal manner or from top dead center to bottom dead center in a reciprocal manner without combustion, comprising:
  detecting position of said piston in said chamber;
  controlling the opening and closing of a first valve and a second valve based on said detected position of said piston in said chamber;
  the air traversing from the source of compressed air into the chamber by opening the first valve, wherein both the first valve and second valve are closed and the compressed air moves the piston in the chamber to produce work, the second valve opening and the air escaping from the chamber.

11. The method of claim 10, further comprising providing compressed air from a tank of compressed air being coupled to a pressure regulator.

12. The method of claim 10, further comprising directing compressed air into an inlet by an intake manifold.

13. The method of claim 10, further comprising directing the compressed air into the inlet valve and wherein the piston is associated with a pneumatic actuator.

14. The method of claim 10, further comprising controlling the valve by a controller.

15. The method of claim 10, further comprising controlling the second valve by a controller.

16. A lawn mower comprising:
a blade being coupled to a drive shaft;
an engine being connected to the drive shaft for rotating the drive shaft;
a tank of compressed air;
the tank of compressed air being connected to a conduit, the conduit being connected to a cylinder of the engine, the engine comprising a first valve and an inlet to a chamber; the chamber comprising a piston and a second outlet being connected to a second valve;
an electric circuit configured for electronically opening and closing said first valve and said second valve, wherein said electric circuit opens and closes said first valve and said second valve based on position of said piston in said chamber, and wherein sensors installed at a top dead center and at bottom dead center of said chamber provide said electric circuit with said position of said piston in said chamber; and
the air traversing from the tank of compressed into the chamber by opening the first valve, wherein both the first valve and second valve are closed and the compressed air moves the piston in the chamber to produce work to rotate the drive shaft and to rotate the blade, the second valve opening and the air escaping from the chamber and the piston, wherein no combustion occurs in the cylinder and the piston reciprocates from the compressed air moving the piston.

* * * * *